(12) United States Patent
Kvesic (10) Patent No.: US 6,896,964 B2
(45) Date of Patent: May 24, 2005

(54) TREATED RUBBER AND PRODUCTS MADE THEREFROM

(75) Inventor: Peter Kvesic, Elmira, OR (US)

(73) Assignee: Ryvec, Inc., Anaheim, CA (US)

( * ) Notice: Subject to any disclaimer, the term of this patent is extended or adjusted under 35 U.S.C. 154(b) by 0 days.

(21) Appl. No.: 10/377,908

(22) Filed: Feb. 28, 2003

(65) Prior Publication Data

US 2003/0215637 A1 Nov. 20, 2003

Related U.S. Application Data

(63) Continuation-in-part of application No. 10/135,498, filed on Apr. 29, 2002, now Pat. No. 6,821,623.

(51) Int. Cl.$^7$ ............................ B32B 5/16; B05D 3/00
(52) U.S. Cl. ............... 428/407; 428/423.9; 428/903.3; 427/222; 427/407.1; 427/444
(58) Field of Search ................ 427/222, 322, 427/407.1, 444; 428/407, 903.3, 423.9

(56) References Cited

U.S. PATENT DOCUMENTS

| | | | |
|---|---|---|---|
| 4,112,176 A | | 9/1978 | Bailey |
| 4,160,866 A | | 7/1979 | Brooks et al. |
| 4,279,439 A | | 7/1981 | Cantieri |
| 4,337,283 A | | 6/1982 | Haas, Jr. |
| 4,438,221 A | | 3/1984 | Fracalossi et al. |
| 4,608,420 A | | 8/1986 | Brindöpke et al. |
| 4,833,205 A | * | 5/1989 | Bauman et al. ............. 525/123 |
| 4,970,043 A | * | 11/1990 | Doan et al. ................. 264/237 |
| 5,151,230 A | * | 9/1992 | Damberg ..................... 264/83 |
| 5,397,825 A | * | 3/1995 | Segrest ...................... 524/270 |
| 5,425,904 A | * | 6/1995 | Smits .......................... 264/115 |
| 5,472,743 A | * | 12/1995 | Daluise ...................... 427/426 |
| 5,514,722 A | | 5/1996 | Di Geronimo |
| 5,604,277 A | * | 2/1997 | Osborn ....................... 524/270 |
| 5,605,721 A | | 2/1997 | Di Geronimo |
| 5,648,031 A | | 7/1997 | Sturtevant et al. |
| 5,714,219 A | * | 2/1998 | Mashunkashey et al. .. 428/36.1 |
| 5,880,165 A | | 3/1999 | Triolo et al. |
| 5,899,519 A | | 5/1999 | Doshi |
| 5,936,055 A | | 8/1999 | Elwell et al. |
| 6,036,998 A | * | 3/2000 | Calvo et al. ................. 427/214 |
| 6,265,454 B1 | * | 7/2001 | McNutt et al. ............... 521/41 |
| 6,579,482 B1 | * | 6/2003 | Faust et al. ................. 264/122 |
| 6,596,208 B1 | * | 7/2003 | Glick et al. .................. 264/78 |
| 6,821,623 B2 | * | 11/2004 | Kvesic ....................... 428/407 |
| 2002/0022086 A1 | * | 2/2002 | Hughes et al. .............. 427/222 |

OTHER PUBLICATIONS

SARTOMER Application Bulletin, "Polyurethane Binders for the Production of Composite Materials", Aug. 2002 (3 pages).*

* cited by examiner

Primary Examiner—H. Thi Le
(74) Attorney, Agent, or Firm—Knobbe, Martens, Olson & Bear LLP (57) ABSTRACT

Treated rubber is made from ground rubber and a polyurethane resin. Products made by mixing treated rubber with additional polyurethane resin, molding and curing the polyurethane have higher tensile strengths and/or elongations than similar products made from untreated rubber. The method using treated rubber uses less polyurethane binder to produce products of equivalent strengths. The molding time is also reduced because of the reduced amount of polyurethane binder used.

69 Claims, 4 Drawing Sheets

TREATED RUBBER AND PRODUCTS MADE THEREFROM

RELATED APPLICATIONS

This application is a continuation-in-part of application Ser. No. 10/135,498, filed on Apr. 29, 2002, now U.S. Pat. No. 6,821,623.

BACKGROUND OF THE INVENTION

1. Field of the Invention

This invention generally relates to recycled rubber products and more particularly to composites made from ground rubber particles and polyurethane binders.

2. Description of the Related Art

Old tires and other rubber articles may be ground into rubber particles suitable for recycling. At the present time in the United States, Canada, and Mexico, over 20 million pounds of recycled rubber are used each month. Recycled rubber is used to produce many finished goods, including welcome mats, animal mats, truck-bed liner mats, playground mats, speed bumps, railroad crossing pads, carpet pads, running tracks, and bases for traffic control devices. Presently, finished goods produced from recycled rubber are made by either vulcanizing the rubber or my making composites using ground rubber and polyurethane binders.

In the vulcanizing process, the rubber is first dried to reduce the water content to less than 0.5%. The rubber is then vulcanized with sulfur. In some cases, the rubber is first treated to give a product with higher tensile strength. Rubber treated for vulcanization cannot be used in the polyurethane binder process.

In the polyurethane binder process, a mixture of ground rubber (crumb rubber) and one or more polyurethane binders is molded or formed and cured. The binder may be cured in a "hot-cure" process, at elevated temperatures, or in a "cold-cure" process, at ambient temperature. Hot-cure processes are typically performed under elevated pressures, and are typically used in manufacturing, for example, for making welcome mats, animal mats, speed bumps, and the like. Cold-cure processes are typically performed at ambient or low pressures, and are typically used when the composite is cured on-site, for example, for playground surfaces, running tracks, and floors for animal stalls. The binder in a hot-cure process typically cures in minutes, whereas the binder in a cold-cure process typically takes days to fully cure.

Many types of binders are used in the polyurethane binder process. The cost of these binders ranges from about $0.70 per pound to about $1.40 per pound. In commercial production processes, the ground rubber is mixed with from about 3% to 20% of the binder, and the mixture is molded into the finished product. Dry rubber, rubber containing less than 0.5% water, is desirable, but not necessary. A finished product made with rubber with a high water content has lower tensile strength than one made with dry rubber, however. Most commercial crumb rubber contains more than 1% water, and few manufacturers dry the rubber.

SUMMARY OF THE INVENTION

Preferred embodiments of the disclosed invention provide articles made from treated rubber particles and polyurethane binders and methods of making composites from treated rubber particles and polyurethane binders. Treated rubber particles are rubber particles coated with polyurethane, made by mixing rubber particles with polyurethane binders. Products made with treated rubber according to the preferred embodiments exhibit higher tensile strengths and/or elongations compared to similar products made from untreated rubber. Alternatively, products may be manufactured using less binder, resulting in cost savings as well as reduced curing times.

Accordingly, the present disclosure provides a treated rubber particle comprising a rubber particle coated with a cured polyurethane resin. Also disclosed is a method of manufacturing treated rubber particles by a method with at least the step of mixing rubber particles with a polyurethane resin until the resin is reacted.

In a preferred embodiment, the rubber particles are recycled. Preferably, the rubber particles are styrene-butadiene rubber or ethylene-propylene-diene monomer rubber. Preferably, the rubber particles are from about 6 mesh to about 60 mesh, more preferably, from about 8 mesh to about 40 mesh.

The polyurethane resin is preferably a diphenylmethane diisocyanate-based or a toluene diisocyanate-based polyurethane resin. The polyurethane resin is preferably a one-part or a two part polyurethane resin. Preferably, the polyurethane resin is from about 0.25% to about 1.5% of the weight of the rubber particles, more preferably, from about 0.5% to about 2% of the weight of the rubber particles, most preferably, about 1% of the weight of the rubber particles.

In a preferred embodiment, a dye or pigment is mixed with the rubber particles and polyurethane resin.

Preferably, the rubber particles and the polyurethane resin are mixed at below about 300° F., more preferably, at from about 100° F. to about 200° F., most preferably, at from about 150° F. to about 180° F. In a preferred embodiment, the mixing is performed in a mortar mixer or a high-speed mixer. In another preferred embodiment, the mixing is performed in a ribbon mixer, preferably, a ribbon mixer is equipped with a double spiral ribbon. In still another preferred embodiment, the mixing is performed in a jacketed mixer.

Also disclosed is a recycled rubber product made from treated rubber particles and a polyurethane binder, wherein a treated rubber particle comprises a rubber particle coated with a cured polyurethane resin. Further disclosed is a method of making a recycled rubber product with at least the steps of mixing treated rubber particles with a polyurethane binder to form a rubber composite; forming a product from the rubber composite; and curing the product, wherein a treated rubber particle comprises a rubber particle coated with a cured polyurethane resin.

Preferably, the polyurethane binder is from about 0.5% to about 25% of the weight of the rubber particles, more preferably, from about 1% to about 3% of the weight of the rubber particles, most preferably, from about 10% to about 20% of the weight of the rubber particles. In a preferred embodiment, the polyurethane binder is a diphenylmethane diisocyanate-based or a toluene diisocyanate-based polyurethane binder. Preferably, the polyurethane binder is a one-part polyurethane binder or a two-part polyurethane binder.

A preferred embodiment further includes untreated rubber particles mixed with the treated rubber and the polyurethane binder. Another preferred includes a dye or pigment mixed with the treated rubber particles and the polyurethane binder.

In a preferred embodiment, the rubber composite is formed in a mold. In another preferred embodiment, the rubber composite is formed by continuous casting.

Preferably, the product is cured at from ambient temperature to about 200° F. In a preferred embodiment, the product is cured at ambient temperature. In another preferred embodiment, the product is cured at from about 200° F. to about 400° F., more preferably, from about 300° F. to about 400° F. In a preferred embodiment, the product is cured at ambient pressure. In another preferred embodiment, the product is cured at elevated pressure, more preferably, at from about 75 psi to about 500 psi, most preferably, at from about 150 psi to about 300 psi.

In a preferred embodiment, the recycled rubber product is a resilient surfacing. In another preferred embodiment, the recycled rubber product is a mat.

DETAILED DESCRIPTION OF THE PREFERRED EMBODIMENTS

As used herein, the term "binder" means "polyurethane binder," which is used interchangeably with the term "polyurethane resin." Unless otherwise indicated, all percentages are by weight. Any type of polyurethane resin or binder suitable for rubber applications may be used in the preferred process, for example one-part, two-part, or latex resins. Preferred polyurethane resins are one-part resins.

The isocyanate component may be of any type known in the art, for example, diphenylmethane diisocyanate (MDI), toluene diisocyanate (TDI), naphthalene diisocyanate (NDI), or hexamethylene diisocyanate (HDI). MDI- and TDI-based urethane resins are preferred, with MDI-based binders particularly preferred. The binder may comprise two or more isocyanates.

The polyol component may also be of any type known in the art, for example, difunctional, trifunctional, tetrafunctional, or even higher. As used herein, "polyol" refers to a species with at least two hydroxyl groups that react with the isocyanate component of a urethane resin upon curing. The polyol may be a monomeric polyol, or a polymeric polyol. Of these, polymeric polyols are preferred. The polymeric portion of the polymeric polyol may include, without limitation, polycarbonates, polyamides, polyesters, polyethers, or combinations thereof. Of these types, polyesters and polyethers are preferred, with polyethers particularly preferred. The polymeric portion may also be a co-polymer. The binder may comprise two or more polyols.

Some binders comprise extenders and are more economical. In cold-cure processes, 100% polyurethane binders are preferred. Binders may be selected for particular properties, such as reaction characteristics, hardness, and the like. Optimizing binder selection is well known in the art, such that binder selection optimization in accordance with the preferred embodiments may be performed in view of the disclosure herein without undue experimentation.

The term "rubber" includes any elastomeric material that may be ground into crumb rubber, and that is compatible with polyurethane binders. A preferred rubber is styrene-butadiene rubber or SBR. Typically, SBR comes from car, truck, or tractor tires, but any type of SBR may be used. Another preferred rubber is ethylene-propylene-diene, monomer rubber or EPDM. EPDM is commonly used in automotive sealing systems and roofing membranes. Yet another preferred rubber is natural rubber.

The rubber is preferably ground to a size of between about ⅜" (9.5 mm) to about 80 mesh (0.17 mm), more preferably, from about 6 mesh (3.36 mm) to about 60 mesh (0.25 mm), most preferably, from about 8 mesh (2.38 mm) to about 40 mesh (0.42 mm). This material is known as crumb rubber. Commercial suppliers typically offer crumb rubber several size ranges. The material may be further sized to narrower ranges by means well known in the art. The particular size and size range of the crumb rubber will depend on the properties required in the final product and may be selected by one skilled in the art without undue experimentation. A particularly preferred size range is from about 1 mm to about 3 mm. Alternatively, rubber particles of particular sizes and/or properties may be combined according to the properties desired in the final product. Another preferred form of rubber is buffing rubber, which is a by-product of buffing-off a tire's tread in the manufacture of retreads. Buffing rubber ranges from about 0.25 mm to about 50 mm. The particles are typically rounded in the smaller sizes and long shreds for the larger sizes.

Because SBR crumb rubber is produced by grinding tires, it may contain tire cord. Crumb rubber with or without polyamide (nylon) or polyester cord content is suitable with the disclosed process, but the rubber is preferably free of metal.

Figure 1:
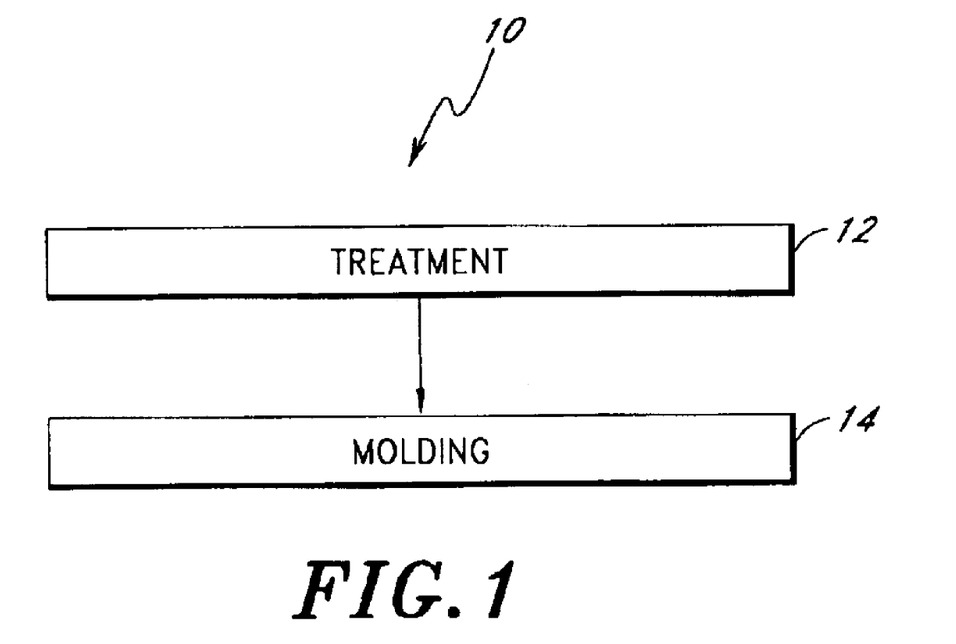
FIG. 1 is a flowchart illustrating a preferred method for making recycled rubber products.
Figure 2A:
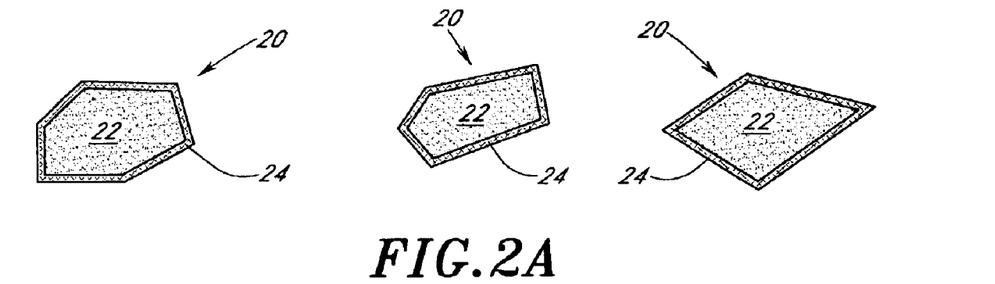
FIGS. 2A–D illustrate treated rubber particles prepared as disclosed herein.
Figure 2B:
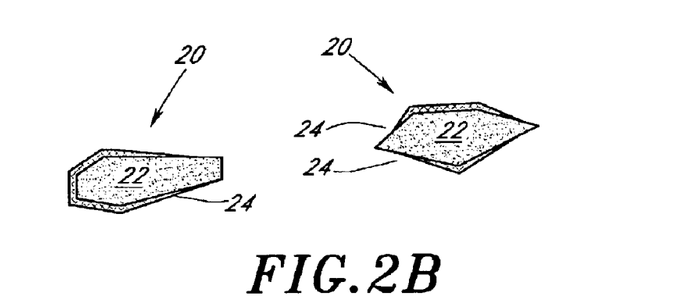
Figure 2C:
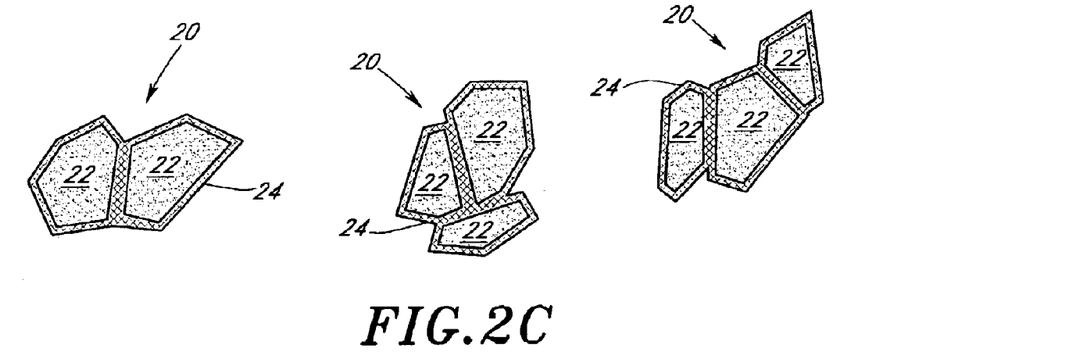
Figure 2D:
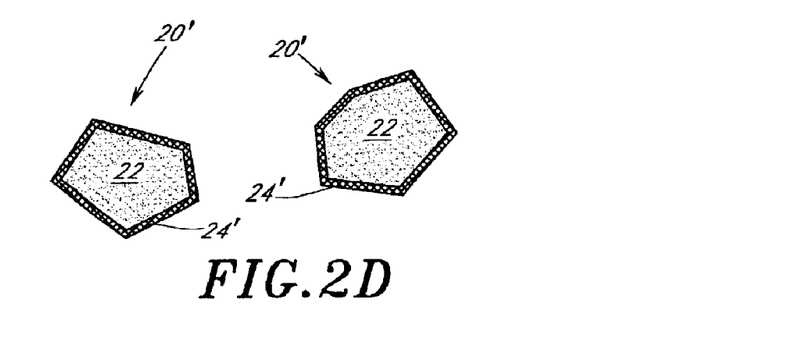

A preferred method 10 illustrated in FIG. 1 has at least two steps. In a treatment step 12, the ground rubber is treated with a polyurethane binder. The product of this step is referred to as "treated rubber" herein. In a molding step 14, the treated rubber is mixed with additional polyurethane binder and formed into a finished product.

In the treatment step 12, ground rubber is preferably mixed with up to about 2% of a polyurethane binder, more preferably, from about 0.25% to about 1.5% of a binder, most preferably, about 1% of a binder. In particular, about 0.25%, 0.5%, 0.75%, 1%, 1.25%, 1.5%, 1.75%, or 2% of the binder may be used in the treatment step. Substantially any binder may be used in this step. Suitable binders for rubber applications are well known in the art and may be used in accordance with the preferred embodiments. Preferably, a fast reaction binder is used in this step. Preferred binders include one-part MDI binders such as MD-400 and MD-403 (Ryvec, Inc., Anaheim, Calif.). The rubber does not need to be dry.

A pigment or dye may optionally be added in this step to color the treated rubber particles. The terms "pigment" and "dye" are used interchangeably herein, and include any pigment or dye known in the art for use with urethane binders. The pigment may be organic or inorganic. Examples of inorganic pigments include carbon black, iron oxide (red or yellow), titanium dioxide. Examples of organic pigments include phthalo blue, phthalo green, quinacridine violet, pyrazolone orange, diarylide yellow, azo yellow, and azo red. The pigment may be added as a 100% solids powder (dry), or may be dispersed in a carrier (wet). Suitable carriers are known in the art, and include polyols, plasticizers, and aromatic oils.

A catalyst may also be added in this step. The catalyst may be of any type known for use in curing polyurethanes, for example, tin, amine, bismuth, or zirconium-based catalysts. Preferred catalysts include stannous octoate, dibutyltin dilaurate, 1,4-diaza-bicyclo[2.2.2]octane (triethylene diamine, TEDA, DABCO®), DABCO derivatives, and the like.

Mixing is continued until the binder is reacted. Preferably, the treated rubber is free of large clumps, more preferably, the free of clumps. A "clump" is an aggregate of rubber particles adhered together with polyurethane. A "large" clump is a clump larger than about the size of the largest ground rubber particle. As will be described in more detail below, treated rubber may contain some aggregates in certain preferred embodiments. Mixing may be performed from ambient temperature up to about 300° F. for from about 1 minute to about 3 hours, or even longer. Higher temperatures typically require shorter mixing times, and vice versa. Mixing time and temperature will also depend on the binder. For example, using 1% of Ryvec MD-403, an MDI binder, the mixing time at ambient temperature, 100° F., 150° F., and 200° F. is about 2 hours, about 1 hour, about 15 minutes, and about 8 minutes, respectively. Preferably, the mixing is performed from about 100° F. to about 200° F. for from 5 minutes to about 30 minutes. Suitable mixing means are well known in the art, for example, high-speed mixers, ribbon mixers, mixer-extruders, mortar mixers, and the like. High-speed mixers can generate temperatures up to about 180° F. without additional heating. Mortar mixers are preferably jacketed. Preferably, a ribbon mixer is used. More preferably, the ribbon mixer is equipped with a double spiral ribbon (a double ribbon mixer). Even more preferably, the double ribbon mixer is jacketed. Ribbon mixers are available in a range of sizes, with speeds of from about 50 rpm to about 120 rpm. The preferred speed depends on the width of the paddles, with wider paddles requiring slower speeds for equivalent mixing results. Optimizing the mixing conditions is within the scope of the skilled artisan in view of the disclosure herein. The treated rubber may be used directly in the molding step or may be stored for future use with no reduction in quality. The treated rubber, and in particular, colored varieties, may also be used as a loose fill material, for example in playgrounds or animal stalls. Although the rubber treatment process is described as a batch process, those skilled in the art will appreciate that the process may also be run as a continuous process.

Treated rubber particles produced in step 12 are illustrated in FIG. 2. Each treated rubber particle 20 is made of a rubber particle 22 and a polyurethane coating 24. The term "coating" does not imply that each rubber particle is completely encased in polyurethane. Each treated rubber particle 20 may be either completely (FIG. 2A) or partially (FIG. 2B) coated with polyurethane. The thickness of the polyurethane coating may vary on each particle, and may vary between particles. The treated rubber particles may also be aggregated as shown in FIG. 2C. In FIG. 2D, a particle 20' is colored with a pigment dispersed in the polyurethane coating 24'.

In the molding step 14, the treated rubber from step 12 is mixed with additional binder to form a rubber composite, and the mixture is formed, then cured into finished products. In another preferred embodiment, the rubber composite contains a mixture of treated and untreated rubber. The rubber composite may be formed by any method known in the art, for example, molding or casting. The molding step 14 is similar to the commercial processes described above except that treated rubber in used instead of untreated rubber. Accordingly, performing and optimizing the molding step is within the scope of the skilled artisan in view of the disclosure herein.

Substantially any type of binder may be used in the molding step 14. Selecting a suitable binder is well known in the art. From about 0.5% to about 25% binder is used in the molding step. Where the product is hot cured, preferably from about 0.5% to about 5%, more preferably, from about 1% to about 3% by weight of the binder is used. Where the product is cold cured, preferably from about 5% to about 25%, more preferably, from about 10% to about 20% by weight of the binder is used. Hot and cold curing are discussed in greater detail below. Preferred binders for the treatment step are also the preferred binders in the molding step. The binder used in this step may be the same or different from the binder used in the treatment step.

A dye or pigment may optionally be added in this step to color the product. A catalyst may also be added in this step. Preferred dyes and pigments, and catalysts are the same as described above for the treatment step. As in the treatment step, any type of mixer known in the art may be used to mix the treated rubber and the binder, for example, high-speed mixers, ribbon mixers, mixer-extruders, mortar mixers, and the like. The treated rubber, binder, optional pigment, and optional catalyst is mixed until substantially uniform, typically, for about one minute.

The resulting mixture is then typically placed into a mold of any type known in the art. The mold is filled by weight or by volume, by means well known in the art, for example, pouring, injection, or spraying. In another preferred embodiment, the treated rubber and binder are mixed within the mold. The mold may be treated with a mold release compound. When using an open mold, the surface of the composite is typically leveled. Different rubber composite formulations may be placed in different parts of the mold. For example, the bottom of a welcome mat may be made from a black composite and a colored composite used for the top.

Curing the composite formed in the molding step 12 may be performed at a variety of temperatures and pressures, as is well known in the art. In a preferred embodiment, the composite is hot-cured. In hot-curing, the product is molded under pressure and heat ("cooked") using, for example, a hydraulic press with heated platens. The platens may be heated by any means known in the art, for example, steam, oil, or electricity. Preferably, the molding is performed at from about 200° F. to about 400° F., more preferably, from about 300° F. to about 400° F. The conditions under which the curing is performed—for example, the amount of binder, type of binder, time, pressure, and temperature at which the product is cured—affects the properties of the product. For example, increasing the pressure typically increases the tensile strength of the product. Preferably, the pressure is from about 75 psi to about 500 psi, more preferably from about 150 psi to about 300 psi. The curing time depends on a variety of factors including the particular binder used, the temperature of the raw materials, the temperature of the platens, and the thickness of the product. Determining particular conditions required to achieve the desired properties is within the knowledge of the skilled artisan in view of the disclosure herein.

In another preferred embodiment, the uncured rubber composite is continuously cast and cured to form the product, for example, to make rolls of resilient flooring material or carpet padding.

In another preferred embodiment, the rubber-urethane composite is cold-cured, from ambient temperature to about 200° F., preferably at ambient temperature and pressure. At low ambient temperatures, for example, in the winter, the composite may be heated with electric heating mats, gas heaters, radiant heaters, heated platens, and the like to promote curing. In another alternative embodiment, the composite is cold-cured under pressure.

Cold-curing is typically used in situations in which the composite is cured in place, for example, in the installation of pour-in-place or paved-in-place resilient surfacing. Such surfacing may be installed indoors or outdoors, anywhere a resilient, durable surface is desirable, for example, the decks of boats or ships, off-shore oil platforms, patios and decks, driveways and garages, and factory floors. The resiliency reduces fatigue and reduces injury in the case of falls. The surfacing is also non-slip and easily cleaned. Resilient surfacing materials are often used in recreational or athletic areas, for example, playground surfaces, amusement parks, gymnasiums, aerobics studios, running tracks, long-jump and pole vault pits, tennis courts, basketball courts, warning tracks, sideline areas, driving ranges, golf-cart paths, and trails. Resilient surfacing is also used for floors in animal enclosures.

In a preferred embodiment, a mold is formed at the installation site by, for example, excavation and/or forming a berm or dam, which may be partially or completely lined with or formed from, for example, concrete, asphalt, landscape cloth, crumb rubber, stone, sand, metal, a polymer membrane, or a combination thereof. The mold may be temporary or permanent. The thickness of mold will depend on the application and may range from about 1/8" to over 36". More preferably, the mold is from about 1/4" to about 24" thick, most preferably from about 3/8" to about 12" thick. The thickness of the mold need not be uniform, for example, the mold may be deeper in the center and shallower at the edges. The mold need not define all of the sides of the finished resilient surfacing, i.e., one or more sides of the mold may be open. In another preferred embodiment, the mold has no sides, that is, the composite is formed on a suitable surface. The mold may be treated to improve adhesion to the composite, with a urethane primer, for example.

Preferably, the rubber composite is made on-site by mixing treated rubber with the binder, using, for example, a mortar mixer. Alternatively, the composite is made off-site and transported to the installation-site. In another embodiment, the composite is mixed in the mold itself. I have discovered that adding a small amount of water while mixing the rubber and urethane binder increases the tensile strength and elongation of the cured product, whether or not the rubber is treated. Preferably up to about 6% of water based on the weight of the binder is added, more preferably from about 3% to about 4%.

The rubber composite formulation is selected according to the desired properties of the finished product, for example, durability, resilience, cost, appearance, or porosity. The properties of the product may also be optimized by using two or more rubber composite formulations, for example, in layers. For example, the bottom of a product may be made from a more resilient composite and the top from a more durable composite. Typically, each layer is allowed to partially or completely cure before the application of the next layer. Colored composites may be used to provide a decorative surface. The rubber composite is then placed in the mold by any means known in the art, for example, by pouring, shoveling, pumping, injecting, or spraying.

The surface of the rubber composite is then finished, for example, by leveling with a trowel, screed, or float. In an another embodiment, the surface is patterned with grooves, depressions, designs, or the like, formed by any means known in the art, for example, by embossing. In another preferred embodiment, the surface is unfinished. In still another embodiment, the surface a finish is applied to the surface, for example, by spraying or rolling. Typically, water is then sprinkled on the surface. The resilient surfacing is walkable in 48-hours, but full-curing of the composite typically takes from about 10 to about 14 days, depending on the formulation and environmental conditions.

In another preferred embodiment, the rubber composite is cast in place using a machine that applies the composite and screeds the surface of the composite. The screed may be heated to partially cure the composite, typically, from about 150° F. to about 200° F. Such a machine may be used to cast a continuous strip of rubber composite of uniform depth, useful in the production of such products as running tracks.

Preferred embodiments of the processes disclosed herein preferably have one or more advantages over known processes. The total amount of binder used may be reduced, which reduces the cost. Embodiments in which the amount of binder is reduced in the molding step have reduced curing times, thereby increasing the rate of production. Products made according to the processes disclosed herein have increased tensile strength and/or elongation properties compared to products made using the same amount of binder using known processes.

Without being bound by any theory, I believe that this treatment step has two beneficial effects. First, the binder reacts with water in the rubber thereby drying the rubber. Second, the binder coats the rubber particles with polyurethane. When additional binder is added in the second step, it binds to the polyurethane coating, leading to the observed higher tensile strengths and elongations in the products made by the disclosed processes.

In the following Examples, the binders are one-part MDI binders. Tensile strength and ultimate elongation were measured according to ASTM D412-92, Method A at 3½" per minute stress. Tensile strength is reported in psi. Elongation is reported as the increase in length at failure as a fraction of the unstretched length.

EXAMPLE 1

Comparative Cold-Cure Results

The effect of different rubber treatment procedures on the tensile strength and elongation of the final product was tested. Each rubber sample was treated under the conditions provided in the "Binder," "Time," "Temp.," "Catalyst," and "Additive" columns of TABLE I. Typically, 800 g of crumb rubber—1–4 mm for EPDM samples and 1–3 mm for SBR samples—were treated in each entry, except for Entry 32 (1100 g) and Entries 15–17 (250 g). Test samples were made from each of these treated rubber samples by a cold-cure process as follows. A 375-g sample of the treated rubber was mixed for 90 seconds with 67.5 g of a one-part MDI urethane binder (T-424, Ryvec, Anaheim, Calif.) and 2.3 g of water using a Kitchen Aid Heavy Duty mixer (Model K5SS). The resulting mixture was poured into a 7"×10"×½" aluminum mold lined with aluminum foil and leveled. The filled molds were placed on a 95° F. platen for 10 hours. Each sample was allowed to cure for 10 days at room temperature. Six specimens were die-cut from each sample. The average tensile strength and elongation at failure of these specimens are reported in TABLE I.

TABLE I

| | Rubber | Binder | Time (min) | Temp (° F.) | Catalyst | Additive(s) | Strength (psi) | Elongation |
|---|---|---|---|---|---|---|---|---|
| 1 | SBR A | | | | | | 70 | 0.38 |
| 2 | SBR A | 2% A | 40 | 160 | 0.1% | 3% Ryvec #1599, 3% Ryvec #475 | 164 | 1.05 |
| 3 | SBR A | 2% B | 8 | 150 | 0.1% | 3% Ryvec #1599, 3% Ryvec #475, 0.1% water | 93 | 0.61 |
| 4 | SBR B | | | | | | 68 | 0.31 |
| 5 | SBR B | 1% A | 30 | 180 | 0.1% | | 160 | 0.92 |
| 6 | SBR B | 1% B | 17 | 160 | 0.1% | | 146 | 0.91 |
| 7 | SBR B | 1% C | 15 | 150 | 0.1% | | 143 | 0.85 |
| 8 | SBR B | 1% D | 25 | 170 | 0.1% | | 150 | 1.0 |
| 9 | SBR B | 1% E | 30 | 160 | 0.1% | | 208 | 1.34 |
| 10 | SBR B | 1% E | 20 | 160 | 0.3% | | 180 | 1.1 |
| 11 | SBR B | 1% F | 30 | 160 | 0.1% | | 165 | 0.99 |
| 12 | SBR C | 1% E | 40 | 160 | | | 130 | 0.77 |
| 13 | SBR C | 1% E | 25 | 160 | 0.1% | | 147 | 0.87 |
| 14 | SBR C | 1% G | 35 | 160 | | | 152 | 0.86 |
| 15 | SBR C | 1% H | 24 h | RT | | 2% Ryvec #372 | 141 | 0.92 |
| 16 | SBR C | 1% H | 24 h | RT | | 2% Ryvec #475 | 147 | 0.88 |
| 17 | SBR C | 1% H | 24 h | RT | | 2% Ryvec #530 | 143 | 0.89 |
| 18 | SBR D | 1% E | 20 | 160 | 0.1% | | 117 | 0.62 |
| 19 | SBR D | 1% E | 32 | 160 | | | 134 | 0.7 |
| 20 | EPDM A | | | | | | 73 | 0.40 |
| 21 | EPDM A | 1% E | 20 | 170 | 0.1% | | 133 | 0.84 |
| 22 | EPDM A | 0.5% E | 20 | 170 | 0.1% | | 112 | 0.65 |
| 23 | EPDM A | 1% G | 15 | 160 | 0.1% | | 131 | 0.75 |
| 24 | EPDM A | 1% I | 12 | 160 | 0.1% | | 122 | 0.62 |
| 25 | EPDM B | | | | | | 74 | 0.37 |
| 26 | EPDM B | 1% J | 15 | 160 | 0.1% | | 127 | 0.92 |
| 27 | EPDM B | 1% E | 20 | 180 | 0.1% | | 154 | 1.19 |
| 28 | EPDM B | 1% K | 30 | 170 | 0.1% | | 160 | 1.3 |
| 29 | EPDM B | 2% A | 50 | 170 | 0.1% | 3% Ryvec #1599, 3% Ryvec #475 | 142 | 0.92 |
| 30 | EPDM B | 2% A | 30 | 170 | 0.1% | 4.5% CaCO$_3$, 1.25% Oil | 164 | 1.27 |
| 31 | EPDM B | 2% A | 40 | 170 | 0.1% | 3.75% 37% Black in Oil | 143 | 0.96 |
| 32 | EPDM B | 2% B | 20 | 160 | 0.1% | | 112 | 0.70 |
| 33 | EPDM B | 2% L | 40 | 180 | 0.1% | | 171 | 1.21 |
| 34 | EPDM C | 1% E | 20 | 170 | 0.1% | | 189 | 0.8 |
| 35 | EPDM C | 1% B | 20 | 160 | 0.045% | 0.045% water | 162 | 0.62 |
| 36 | EPDM D | 1% E | 25 | 160 | 0.1% | | 131 | 1.0 |
| 37 | EPDM D | 1% E | 40 | 160 | | | 138 | 1.02 |

The sources for the recycled rubber samples used in TABLE I are as follows: SBR A, Scientific Developments, Inc.; SBR B, Atlas Polytech Inc. Black 1–3; SBR C, Recovery Technologies Group, Inc. 1–3; SBR D, BAS Recycling, Inc. 1–3; EPDM A, No Fault Industries #12; EPDM B, Safe Guard Surfacing #13; EPDM C, virgin blue EPDM; EPDM D, No Fault Industries #1.

In entries using a catalyst, the catalyst was stannous octoate (T catalyst, Ryvec, Anaheim, Calif.) diluted 20:1 to simplify measurement. In the "Additive" column, Ryvec #1599 is a dry red (iron oxide) pigment; Ryvec #372, Ryvec #475, and Ryvec #530 are wet (dispersed) blue, red, and green pigments, respectively. "Oil" in entries 15 and 16 is Sunoco 840 aromatic oil.

A description of the binders used in TABLE I is provided in TABLE II.

TABLE II

| Binder | Formulation |
|---|---|
| A | Ryvec T-424 |
| B | 5% PAPI 199, 20% PAPI 27, 36% 5000 MW polyol, 29% Oil |
| C | 14% NCO (generic MDI) |
| D | 36% Lupranate MM103, 64% 3000 MW polyol |
| E | 36% Lupranate MM103, 44% 2000 MW diol, 20% Oil |
| F | 5% PAPI 199, 31% PAPI 27, 27% 5000 MW polyol, 37% Oil |

TABLE II-continued

| Binder | Formulation |
|---|---|
| G | 36% Lupranate MM103, 44% 3000 MW polyol, 20% Oil |
| H | Ryvec T-427 |
| I | 36% Lupranate MM103, 44% 3000 MW polyol, 20% TXIB |
| J | 36% Lupranate MM103, 64% 5000 MW EO-capped polyol |
| K | 18% Huntsman 3050 MDI, 18% Lupranate MM103, 64% 3000 MW polyol |
| L | 10.5% PAPI 27, 20% Huntsman 3050 MDI, 54% 3000 MW polyol, 15.5% Oil |

The following notes apply to TABLE II: "PAPI" is a trademark of Dow Chemical for poly-MDI binders. "Lupranate®" is a registered trademark of BASF for MDI. "TXIB" is a trademark of Eastman Chemical for 2,2,4-trimethyl-1,3-pentanediol diisobutyrate plasticizer. Polyols were purchased from Dow Chemical. "EO-capped polyol" refers to ethylene oxide-capped polyol purchased from Dow Chemical. "Oil" refers to Sunoco 840 aromatic oil.

As shown in TABLE I, test samples made from treated rubber show improved tensile strengths and elongations compared to products made from untreated rubber for both SBR and EPDM rubbers under all treatment conditions tested. For SBR, the highest strengths and elongations were observed for binder E (Entries 9 and 10); however, all of the binders gave good results compared with untreated SBR (Entries 1 and 4). For EPDM, the best result was, again, observed with binder E (Entry 34); again, all of the other binders gave good results compared to untreated EPDM (Entries 20 and 25). The variabilities in the test results probably arise at least in part from the variabilities in the rubber samples.

Particular experiments demonstrate the effect of additives in the treatment step on the properties of the finished products. In each case, test samples made from additive-modified treated rubber displayed superior strengths and elongations compared with samples made from untreated rubber. In Entries 2, 3, 15, 16, 17, and 29, color pigments were added in the treatment step to color the rubber. In Entry 31, carbon black was dispersed in oil and added in the treatment step to color the rubber black. In Entry 30, calcium carbonate was added to simulate a filler often found in recycled rubber. Oil was added in this experiment to improve mixing. Small amounts of water do not appear to affect the strength and elongation properties of the finished products (Entries 3 and 35).

A direct comparison of the tensile strength and elongation properties between treated and untreated rubber in a cold-cure process is provided in TABLE III.

TABLE III

| | Rubber | Tensile Strength | Elongation |
|---|---|---|---|
| 1 | Untreated SBR A | 68 psi | 0.31 |
| 2 | Treated SBR A | 180 psi | 1.1 |
| 3 | 1:1 Untreated SBR A & virgin blue EPDM | 79 psi | 0.42 |
| 4 | 1:1 Treated SBR A & virgin blue EPDM | 169 psi | 0.92 |

The "SBR A" crumb rubber used in TABLE III was the same rubber used in Entries 1–3 of TABLE I. The "virgin blue EPDM" used in TABLE III is the same as EPDM C in TABLE I. The treated rubber samples were prepared as described for Entry 10 of TABLE I (1% binder E, 160° F., 0.1% catalyst). Test specimens were prepared as described for TABLE I using 18% T-424 binder (Ryvec, Anaheim, Calif.) and 0.6% water.

Again, the treated rubber provided products with superior tensile strengths and elongations compared with the untreated rubber. Note that in Entry 4, the EPDM was not treated, yet the product made with half-treated and half-untreated rubber displayed significantly improved properties compared to the untreated rubber in Entry 3.

EXAMPLE 2

Comparative Hot-Cure Results

The results provided in TABLE IV and TABLE V compare samples made by the disclosed process and by the commercial process under hot-cure conditions. For each set of conditions, three ¼"×6"×6" samples were molded, and three specimens cut from each sample for tensile strength testing (nine specimens for each set of conditions). The rubber used in these experiments was SBR. The "Rubber" column indicates the conditions under which the treatment step was performed. The "Binder," "Temp.," "Time," and "Mold Pressure" columns indicate the conditions under which the molding step was performed. The "Tensile Strength" column indicates the average tensile strength for samples made under the specified conditions.

TABLE IV compares the effect of using different amounts of binder in the treatment step. For the treated rubber, the amount of binder used in the molding step was adjusted such that the total amount of binder used was 2.5%. For the standard and dried rubber, 3% binder was used. The SBR rubber used in these tests contained large amounts of nylon. The treatment and molding steps use different binders in these examples.

TABLE IV

| | Rubber | Binder | Temp. | Time | Mold Pressure | Tensile Strength |
|---|---|---|---|---|---|---|
| 1 | Standard | 3.00% | 300° F. | 2 min | 150 psi | 215 psi |
| 2 | Dried | 3.00% | 300° F. | 2 min | 150 psi | 224 psi |
| 3 | 0.25% Treated | 2.25% | 300° F. | 2 min | 150 psi | 249 psi |
| 4 | 0.50% Treated | 2.00% | 300° F. | 2 min | 150 psi | 261 psi |
| 5 | 1.00% Treated | 1.50% | 300° F. | 2 min | 150 psi | 265 psi |
| 6 | 1.50% Treated | 1.00% | 300° F. | 2 min | 150 psi | 264 psi |

Under the "Rubber" column of TABLE IV, "Standard" refers to untreated rubber, "Dried" refers to rubber dried at 250° F. for 15 minutes, and "Treated" refers to rubber treated with the stated percentage of MD-403 binder (Ryvec, Inc., Anaheim, Calif.) for 15 minutes at 150° F. The binder used in these experiments was MD-400 binder (Ryvec, Anaheim, Calif.), a one-part MDI binder.

As expected, products molded from dried rubber (Entry 2) are stronger than those molded from standard rubber (Entry 1). As shown in Entry 3, as little as 0.25% of binder in the treatment step increased the tensile strength of the product compared to the product made from either the standard or dried rubbers. The difference between tensile strength advantage for the treated rubber is probably greater than that indicated in this table because the total amount of binder used in the Entries 1 and 2 was 3%, while in the total amount used in Entries 3 to 6 was only 2.5%. The tensile strength of the product increases with the amount of binder used in the treatment step, up to about 1% binder under these conditions (compare Entry 4 with Entry 5).

TABLE V compares the tensile strengths of samples made from three of SBR rubber—standard, dried, and 1% treated—under varying molding conditions. The rubber used in these tests contained less nylon than the rubber used in the tests described in TABLE IV.

TABLE V

| | Rubber | Binder | Temp. | Time | Mold Pressure | Tensile Strength |
|---|---|---|---|---|---|---|
| 7 | Standard | 3% | 300° F. | 2 min | 150 psi | 229 psi |
| 8 | Dried | 3% | 300° F. | 2 min | 150 psi | 273 psi |
| 9 | Treated | 1.5% | 300° F. | 2 min | 150 psi | 302 psi |
| 10 | Standard | 3% | 300° F. | 2 min | 220 psi | 237 psi |
| 11 | Dried | 3% | 300° F. | 2 min | 220 psi | 283 psi |
| 12 | Treated | 3% | 300° F. | 2 min | 220 psi | 379 psi |
| 13 | Treated | 2% | 300° F. | 2 min | 220 psi | 351 psi |
| 14 | Treated | 1.5% | 300° F. | 2 min | 220 psi | 343 psi |
| 15 | Treated | 1% | 300° F. | 2 min | 220 psi | 282 psi |
| 16 | Standard | 3% | 300° F. | 2 min | 500 psi | 289 psi |
| 17 | Dried | 3% | 300° F. | 2 min | 500 psi | 346 psi |
| 18 | Treated | 3% | 300° F. | 2 min | 500 psi | 529 psi |
| 19 | Standard | 3% | 400° F. | 40 sec | 75 psi | 147 psi |
| 20 | Dried | 3% | 400° F. | 40 sec | 75 psi | 179 psi |
| 21 | Treated | 2% | 400° F. | 30 sec | 75 psi | 232 psi |
| 22 | Treated | 1.5% | 400° F. | 30 sec | 75 psi | 200 psi |
| 23 | Treated | 1.5% | 400° F. | 20 sec | 75 psi | 169 psi |

Under the "Rubber" column of TABLE V, "Standard" refers to untreated rubber, "Dried" refers to rubber dried at 250° F. for 15 minutes, and "Treated" refers to rubber treated with the 1% by weight of MD-403 binder (Ryvec, Inc., Anaheim, Calif.) for 15 minutes at 150° F. The binder used in these experiments was MD-400 binder (Ryvec, Inc., Anaheim, Calif.).

The tensile strength of the product increased in Entries 7, 8, and 9 for standard, dried, and treated rubber, respectively. Again, the total binder content in Entry 9, 2.5%, was less that in Entries 7 and 8, 3%, and the Entry 9 product is stronger. A direct comparison at constant binder content and identical molding conditions is provided in Entries 10, 11, and 13. Again, the treated rubber (Entry 13) gives a stronger product than the dried rubber (Entry 11), which in turn is stronger than standard rubber (Entry 10).

EXAMPLE 3

Animal Mats

The following is a typical large-scale rubber treatment procedure. Ground rubber was preheated to 150° F. and combined with 1% MDF-403 binder (Ryvec, Inc., Anaheim, Calif.) with constant mixing in a jacketed ribbon mixer equipped with a double spiral ribbon. Treatment was complete in about 15 minutes.

100 lb of 1% treated rubber was mixed with 15 lb MD-400 binder (Ryvec, Inc., Anaheim, Calif.) for 1 minute. The mixture was placed into molds (¾"×4'×8') and leveled. The molds were placed into a press with heated platens for 7 minutes at 150 psi and 280° F. The mats reached full tensile strength in about 24 hours.

Figure 3:
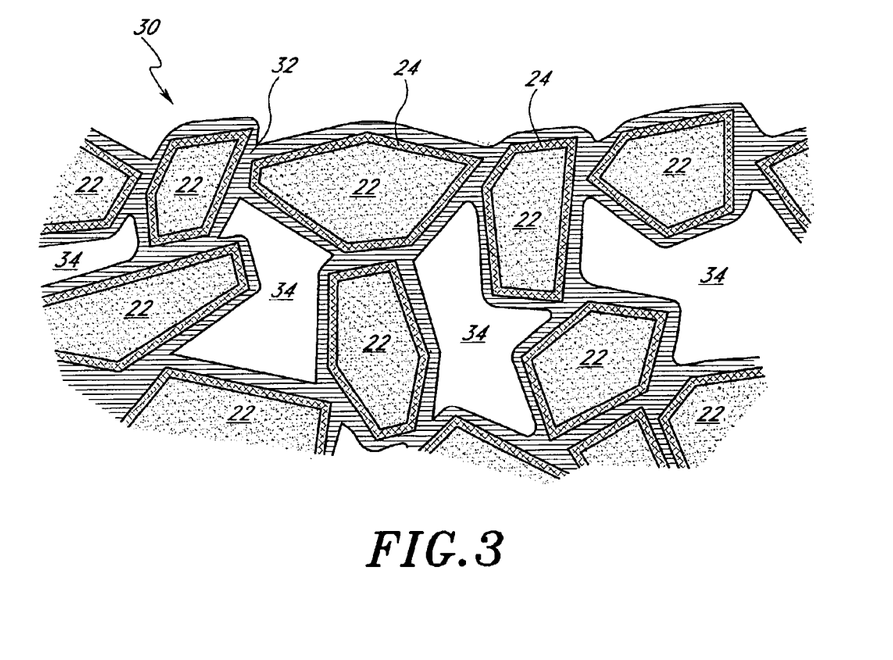
FIG. 3 is a cross-section of an animal mat made according to a preferred embodiment of this disclosure.

A mat 30 is shown in cross-section in FIG. 3. Treated rubber particles 20 are made of rubber particles 22 coated with the first urethane binder 24. The treated rubber particles 20 and a second urethane binder 32 form a rubber composite that forms the mat 30. The mat may have voids 34, the size of which will depend on factors including the size and shape of the treated rubber particles 20, and the type and amount of polyurethane binder 32 used to fabricate the mat.

EXAMPLE 4

Playground Surface

The area to be surfaced is excavated to a depth of about 10". A base of 6" of crushed rock is placed in the excavation, compacted, leveled, and covered with a layer of landscape fabric. A 3½" lower rubber layer is applied over the crushed rock base as follows. Buffing rubber (1,200 lb) is mixed in batches with from about 12% to about 20% by weight a one-part MDI polyurethane binder for about 90 seconds in a mortar mixer, poured over the landscape fabric to the required depth, and leveled. The lower rubber layer is allowed to cure for about 12 hours.

A ½" upper rubber layer applied over the lower rubber layer as follows. A 1:1 mixture of treated recycled SBR crumb (90 lb, 1–3 mm and treated according to Entry 12B in TABLE I) and virgin colored EPDM crumb (90 lb, 1–3 mm and treated according to Entry 12B in TABLE I) is mixed with 18% to 20% by weight of a one-part MDI binder such as Ryvec T-424 and 0.6% water for about 90 seconds in a mortar mixer. The rubber composite is applied over the lower rubber layer and leveled. The surface is sprinkled with 3% by weight of binder of water. The playground surface is walkable in about 48 hours and fully cured in about 10 to 14 days.

Figure 4:
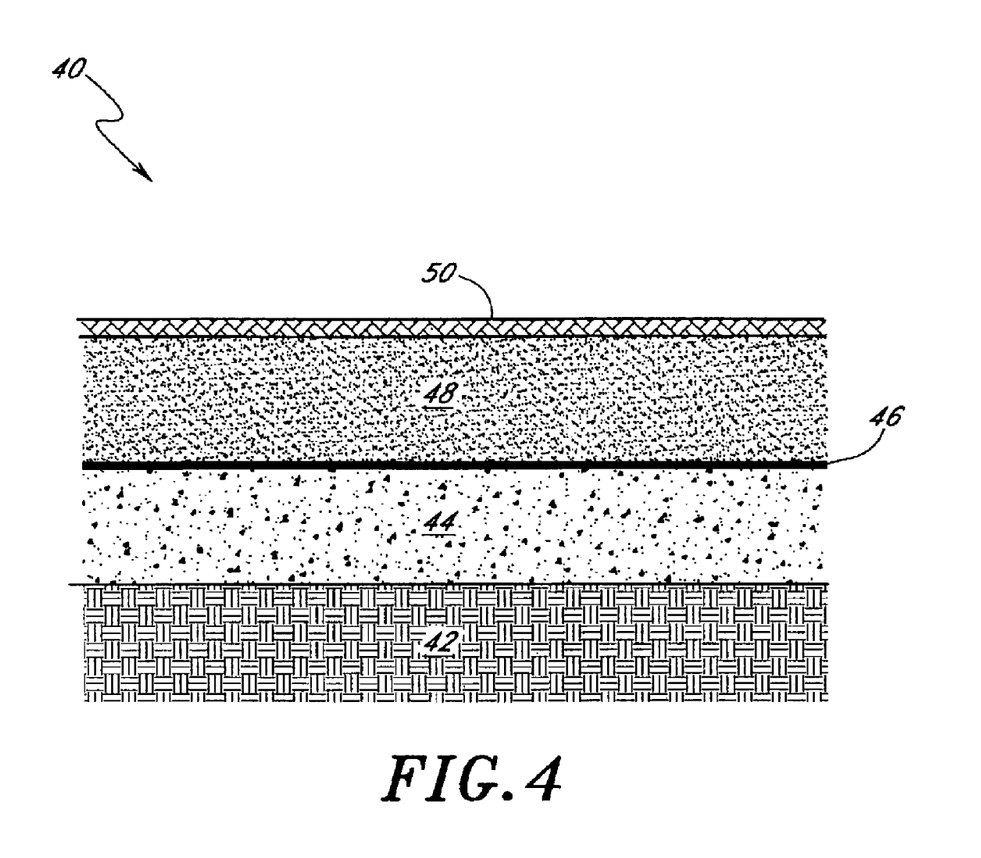
FIG. 4 is a cross-section of a playground surface made according to a preferred embodiment of this disclosure.

A cross-section of the playground surface 40 described above is illustrated in FIG. 4. The playground surface comprises a crushed rock base layer 44 over on an earthen substrate 42, which is not part of the playground surface. A layer of landscape fabric 46 overlies the crushed rock followed by a lower rubber layer 48 and an upper rubber layer 50.

The foregoing examples serve to illustrate the preferred embodiment and are not intended as limitations. Modifications and variations of the preferred embodiment will be apparent to those skilled in the art without departing from spirit of the invention, the scope of which is limited only by the appended claims.

I claim:

1. A method of making coated rubber particles comprising mixing rubber particles with a polyurethane resin until the resin is cured and the mixture is substantially free of large clumps.

2. The method of claim 1, wherein the rubber particles are recycled.

3. The method of claim 1, wherein the rubber particles are styrene-butadiene rubber.

4. The method of claim 1, wherein the rubber particles are ethylene-propylene-diene monomer rubber.

5. The method of claim 1, wherein the rubber particles are from about 6 mesh to about 60 mesh.

6. The method of claim 5, wherein the rubber particles are from about 8 mesh to about 40 mesh.

7. The method of claim 1, wherein the polyurethane resin is a diphenylmethane diisocyanate-based polyurethane resin.

8. The method of claim 1, wherein the polyurethane resin is a toluene diisocyanate-based polyurethane resin.

9. The method of claim 1, wherein the polyurethane resin is a one-part polyurethane resin.

10. The method of claim 1, wherein the polyurethane resin is a two-part polyurethane resin.

11. The method of claim 1, wherein the polyurethane resin is from about 0.25% to about 1.5% of the weight of the rubber particles.

12. The method of claim 11, wherein the polyurethane resin is from about 0.5% to about 2% of the weight of the rubber particles.

13. The method of claim 12, wherein the polyurethane resin is about 1% of the weight of the rubber particles.

14. The method of claim 1 further comprising mixing a dye or pigment with the rubber particles and polyurethane binder.

15. The method of claim 1, wherein mixing is performed at below about 300° F.

16. The method of claim 15, wherein mixing is performed at from about 100° F. to about 200° F.

17. The method of claim 16, wherein mixing is performed at from about 150° F. to about 180° F.

18. The method of claim 1, wherein mixing is performed in a mortar mixer.

19. The method of claim 1, wherein mixing is performed in a high-speed mixer.

20. The method of claim 1, wherein mixing is performed in a ribbon mixer.

21. The method of claim 20, wherein the ribbon mixer is equipped with a double spiral ribbon.

22. The method of claim 1, wherein mixing is performed in a jacketed mixer.

23. A recycled rubber product comprising:
a granulate of treated rubber particles and
a polyurethane binder,
wherein the granulate of treated rubber particles comprises rubber particles coated with a cured polyurethane resin, and wherein the granulate of treated rubber particles is substantially free of large clumps.

24. The recycled rubber product of claim 23, wherein the polyurethane binder is from about 0.5% to about 25% of the weight of the rubber particles.

25. The recycled rubber product of claim 24, wherein the polyurethane binder is from about 1% to about 3% of the weight of the rubber particles.

26. The recycled rubber product of claim 24, wherein the polyurethane binder is from about 10% to about 20% of the weight of the rubber particles.

27. The recycled rubber product of claim 23, wherein the polyurethane binder is a diphenylmethane diisocyanate-based polyurethane binder.

28. The recycled rubber product of claim 23, wherein the polyurethane binder is a toluene diisocyanate-based polyurethane binder.

29. The recycled rubber product of claim 23, wherein the polyurethane binder is a one-part polyurethane binder.

30. The recycled rubber product of claim 23, wherein the polyurethane binder is a two-part polyurethane binder.

31. The recycled rubber product of claim 23 further comprising untreated rubber particles.

32. The recycled rubber product of claim 23 further comprising a dye or pigment.

33. The recycled rubber product of claim 23, wherein the recycled rubber product is a resilient surfacing.

34. The recycled rubber product of claim 23, wherein the recycled rubber product is a mat.

35. A method of making a recycled rubber product comprising:
    mixing a granulate of treated rubber particles with a polyurethane binder to form a rubber composite;
    forming a product from the rubber composite; and
    curing the product,
    wherein the granulate of treated rubber particles comprise rubber particles coated with a cured polyurethane resin, and wherein the granulate of treated rubber particles is substantially free of large clumps.

36. The method of claim 35, wherein the polyurethane binder is from about 0.5% to about 25% of the weight of the rubber particles.

37. The method of claim 36, wherein the polyurethane binder is from about 1% to about 3% of the weight of the rubber particles.

38. The method of claim 36, wherein the polyurethane binder is from about 10% to about 20% of the weight of the rubber particles.

39. The method of claim 35, wherein the polyurethane binder is a diphenylmethane diisocyanate-based polyurethane binder.

40. The method of claim 35, wherein the polyurethane binder is a toluene diisocyanate-based polyurethane binder.

41. The method of claim 35, wherein the polyurethane binder is a one-part polyurethane binder.

42. The method of claim 35, wherein the polyurethane binder is a two-part polyurethane binder.

43. The method of claim 35 further comprising mixing untreated rubber particles with the treated rubber and the polyurethane binder.

44. The method of claim 35 further comprising mixing a dye or pigment with the treated rubber particles and the polyurethane binder.

45. The method of claim 35, wherein the rubber composite is formed in a mold.

46. The method of claim 35, wherein the rubber composite is formed by continuous casting.

47. The method of claim 35, wherein the product is cured at from ambient temperature to about 200° F.

48. The method of claim 47, wherein the product is cured at ambient temperature.

49. The method of claim 35, wherein the product is cured at from about 200° F. to about 400° F.

50. The method of claim 49, wherein the product is cured at from about 300° F. to about 400° F.

51. The method of claim 35, wherein the product is cured at ambient pressure.

52. The method of claim 35, wherein the product is cured at elevated pressure.

53. The method of claim 52, wherein the product is cured at from about 75 psi to about 500 psi.

54. The method of claim 53, wherein the product is cured at from about 150 psi to about 300 psi.

55. A granulate of treated rubber particles, wherein a treated rubber particle comprises a rubber particle coated with cured polyurethane resin, and wherein the polyurethane resin does not contain a dye or pigment, and wherein the granulate is substantially free of large clumps.

56. The granulate of claim 55, wherein the rubber particle is recycled.

57. The granulate of claim 55, wherein the rubber particle is styrene-butadiene rubber.

58. The granulate of claim 55, wherein the rubber particle is ethylene-propylene-diene monomer rubber.

59. The granulate of claim 55, wherein the rubber particle is from about 6 mesh to about 60 mesh.

60. The granulate of claim 59, wherein the rubber particle is from about 8 mesh to about 40 mesh.

61. The granulate of claim 55, wherein the polyurethane resin is a diphenylmethane diisocyanate-based polyurethane resin.

62. The granulate of claim 55, wherein the polyurethane resin is a one-part polyurethane resin.

63. The granulate of claim 55, wherein the polyurethane resin is from about 0.25% to about 2% of the weight of the rubber particle.

64. The granulate of claim 63, wherein the polyurethane resin is from about 0.5% to about 1.5% of the weight of the rubber particle.

65. The granulate of claim 64, wherein the polyurethane resin is about 1% of the weight of the rubber particle.

66. A granulate of treated rubber particles, wherein a treated rubber particle comprises a rubber particle coated with less than about 1% by weight of a cured polyurethane resin, wherein the granulate of treated rubber particles is substantially free of large clumps.

67. The granulate of claim 66, wherein the rubber particle is styrene-butadiene rubber.

68. The granulate of claim 66, wherein the polyurethane resin is a diphenylmethane diisocyanate-based polyurethane resin.

69. The granulate of claim 66, wherein the polyurethane coating further comprises a dye or pigment.

* * * * *